United States Patent [19]

Henley et al.

[11] Patent Number: 5,607,297
[45] Date of Patent: Mar. 4, 1997

[54] MOVING BED PROCESS FOR CARBOTHERMALLY SYNTHESIZING NONOXIDE CERAMIC POWDERS

[75] Inventors: John P. Henley; Gene A. Cochran; David A. Dunn; Glenn A. Eisman; Alan W. Weimer, all of Midland, Mich.

[73] Assignee: The Dow Chemical Company, Midland, Mich.

[21] Appl. No.: 296,051

[22] Filed: Aug. 24, 1994

Related U.S. Application Data

[60] Division of Ser. No. 1,990, Jan. 8, 1993, Pat. No. 5,370,854, which is a continuation-in-part of Ser. No. 673,624, Mar. 22, 1991, abandoned.

[51] Int. Cl.⁶ ........................................ F27D 1/08
[52] U.S. Cl. .................. 432/99; 432/95; 432/100; 432/178; 432/200
[58] Field of Search .................. 432/95, 99, 100, 432/178, 200

[56] References Cited

U.S. PATENT DOCUMENTS

| | | | |
|---|---|---|---|
| 1,212,119 | 1/1917 | Serpek | 423/412 |
| 2,962,359 | 11/1960 | Perieres et al. | 23/192 |
| 3,032,398 | 5/1962 | Clair | 23/192 |
| 3,383,196 | 5/1968 | Carpenter | 423/440 |
| 4,529,575 | 7/1985 | Enomoto et al. | 423/345 |
| 4,618,592 | 10/1986 | Kuramoto et al. | 501/96 |
| 4,784,839 | 11/1988 | Bachelard et al. | 423/290 |
| 4,917,877 | 4/1990 | Oguni et al. | 423/412 |
| 4,983,553 | 1/1991 | Dunn et al. | 423/412 |

FOREIGN PATENT DOCUMENTS

| | | | |
|---|---|---|---|
| 2200101 | 7/1988 | United Kingdom | 423/412 |

OTHER PUBLICATIONS

D. Kunii, et al., "Gross Behavior of Fluidized Beds", *Fluidization Engineering*, pp. 72–103.

S. Ergun, "Fluid Flow Through Packed Columns," *Chemical Engineering Progress*, Feb. 1952, vol. 48, No. 2, pp. 89–94.

*Primary Examiner*—Henry A. Bennett
*Assistant Examiner*—Siddmarth Ohri

[57] ABSTRACT

Carbothermally reduce a metal oxide to its corresponding metal nitride or metal carbide powder in a vertical gravity flow reactor by adding precursor pellets containing the metal oxide, a thermally decomposed binder material and carbon or a source of carbon directly to a heated reaction zone within the reactor. The pellets form a pellet bed, the top of which must be maintained within the heated reaction zone. The binder material is a blend of wheat and corn starches, optionally in conjunction with another binder such as melamine. The binder material thermally decomposes to a carbonaceous residue which functions both as an additional source of carbon and as a binder for the precursor pellets. The reactor may be modified by adding an internal vent line to remove volatile materials from the heated reaction zone before they have an opportunity to condense on internal reactor surfaces.

5 Claims, 2 Drawing Sheets

MOVING BED PROCESS FOR CARBOTHERMALLY SYNTHESIZING NONOXIDE CERAMIC POWDERS

CROSS REFERENCE TO RELATED APPLICATIONS

This is a divisional of application Ser. No. 08/001,990 filed Jan. 8, 1993, now U.S. Pat. No. 5,510,854. This is a continuation-in-part of application Ser. No. 07/673,624, filed Mar. 22, 1991, now abandoned.

BACKGROUND OF THE INVENTION

The present invention relates generally to carbothermally reduced ceramic materials such as aluminum nitride (AlN), silicon nitride ($Si_3N_4$) or silicon carbide (SIC) formed from a corresponding oxide in the presence of carbon.

RELATED ART

U.S. Pat. No. 3,032,398 to J. Clair discloses a process and furnace for continuously producing AlN. Pellets composed of aluminum oxide ($Al_2O_3$), carbon and a calcium aluminate binder continually pass downward from a preheating zone into an elongated, externally heated reaction zone against a countercurrent flow of gaseous nitrogen. The pellets are heated uniformly to a temperature not in excess of 1750° Centigrade (°C.) while in the reaction zone to form AlN. The AlN is continuously removed at a point below the reaction zone and recovered. Reaction gases pass upward out of the reaction zone into an expansion zone maintained at a temperature that causes volatile calcium species contained in the reaction gases to condense and be deposited within the expansion chamber. The reaction gases, less the calcium components, exit the top of the expansion zone. The calcium-containing deposits may be removed periodically from the expansion zone without interrupting the flow of pellets through the furnace.

Japanese Patent Publication 61-47435 discloses a method for manufacturing AlN powder. Pellets consisting of $Al_2O_3$ powder and carbon powder in the presence of a binder are fed to a vertical furnace and fired at a temperature of 1400° to 1800° C. in a nitrogen-containing atmosphere. The pellets, which must have a compressive strength of 2–40 kilograms per pellet, are fed from the top of the furnace. After the furnace is packed with pellets, the pellets are fired in the presence of a nitrogen-containing gas to form AlN which is subsequently removed from the furnace. The binders are preferably organic binders and include water-soluble polymers such as polyvinyl alcohol, etc., hydroxyethyl cellulose, carboxymethylcellulose, molasses, hydrophobic binders such as petroleum resins, phenolic resins, etc. The starting pellets may be added continuously to fill the furnace provided product pellets are removed continuously from the bottom of the furnace.

SUMMARY OF THE INVENTION

One aspect of the present invention is a process for preparing a metal nitride or metal carbide powder from a corresponding metal oxide which comprises: a) adding calcined, porous precursor pellets directly to a heated, elongated reaction zone of a vertical, gravity flow, carbothermal reactor at a rate sufficient to partially, but not completely, fill said reaction zone and form a bed of pellets that flows downward through said reaction zone against a countercurrent gaseous flow and is renewed as more precursor pellets are added to the reaction zone, the gaseous flow comprising nitrogen when preparing metal nitrides and argon when preparing metal carbides, the precursor pellets, when added, being at a temperature less than or equal to that at which calcination occurs, said precursor pellets comprising at least one metal oxide, carbon or a source of carbon, a binder and, optionally, a nucleating agent, the metal oxide and, optionally, the carbon containing iron as an impurity, the reaction zone being maintained at a temperature sufficient to (1) devolatilize and remove at least a portion of metal contaminants that volatilize at reaction zone temperatures from said pellets and (2) carbothermally reduce the metal oxide to its corresponding metal nitride or metal carbide; (b) devolatilizing the precursor pellets at a rate sufficient to ensure that substantially all volatile components exit the reactor without condensing either on internal reactor surfaces or upon other pellets within the bed of pellets; and (c) carbothermally reducing the metal oxide to its corresponding metal nitride or metal carbide, the metal nitride or metal carbide having less iron than the corresponding precursor pellets.

A second aspect of the present invention is an improved vertical, gravity flow, moving bed carbothermal reactor having a first end, a second end and, disposed between and operatively connected to said first and second ends, a heated elongated reaction zone, the improvement comprising adding a means for removing volatile materials from the heated reaction zone to substantially reduce condensation of such materials on internal reactor surfaces, the means being spaced apart from internal reactor surfaces that define the heated reaction zone and in operative contact with the first end of the reactor and said reaction zone. The means is preferably an internal vent line (also known as a "dip tube").

In a related aspect, the improvement further comprises a means for minimizing nonuniform heating and improving heat transfer within the heated reaction zone, the means being in operative contact with at least a portion of the internal reactor surfaces.

DESCRIPTION OF THE PREFERRED EMBODIMENTS

The above features and other details of the method and apparatus of the invention are now more particularly described with reference to the accompanying drawings and pointed out in the claims. The same number present in different Figures represents the same item. Where the item is similar, but not identical, the number is modified by adding a prime symbol after the number, e.g., 10'.

Figure 1:
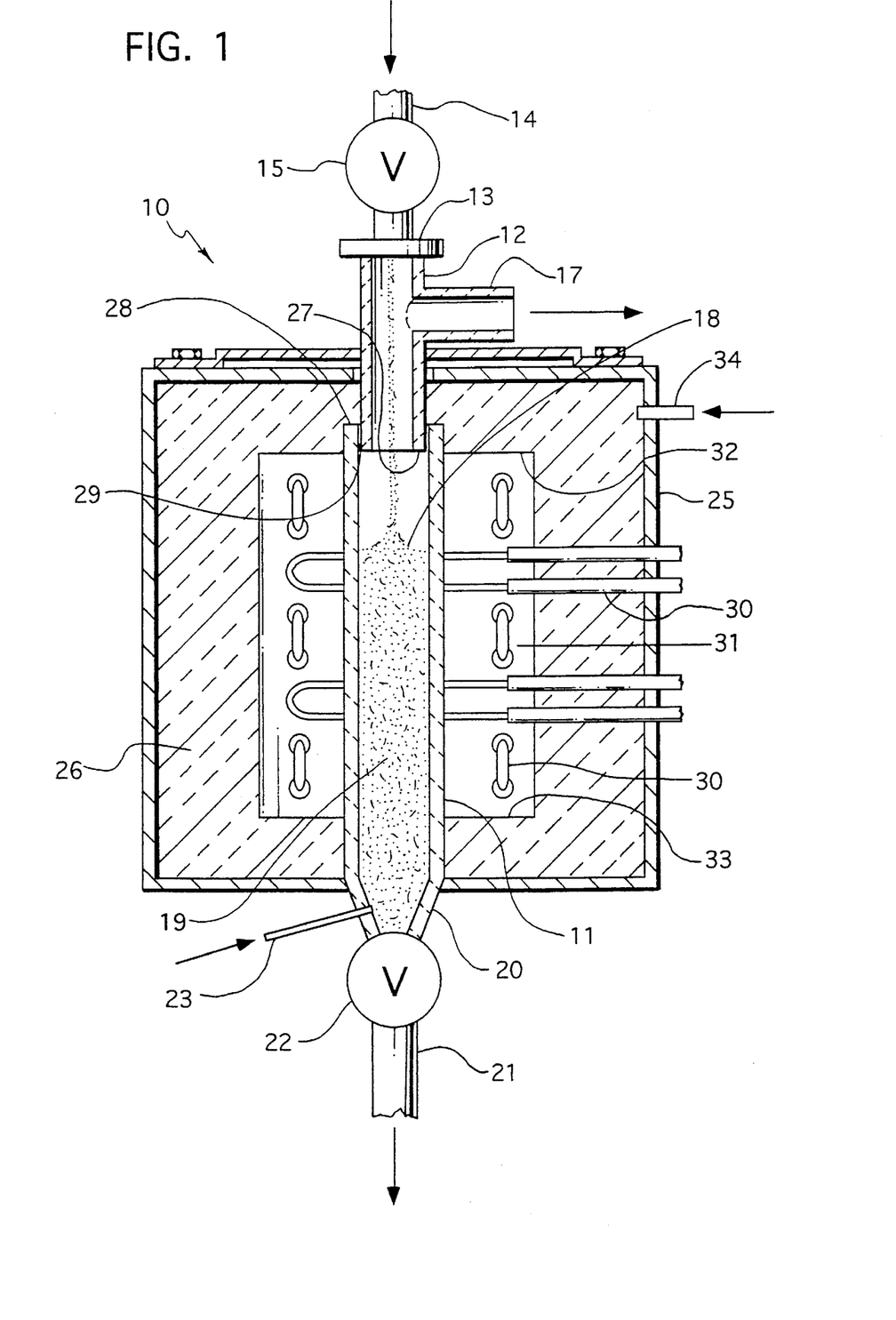
FIG. 1 is a schematic vertical, partial sectional view of a furnace apparatus suitable for use in conjunction with the process of the present invention.

The furnace designated by reference numeral 10 (FIG. 1) consists of a vertical vessel 11 and a plurality of heating elements 30. The vertical vessel 11 includes an upper end portion 12 capped by a flange 13 and a lower end portion 20 operatively connected to a discharge conduit 21. Disposed within discharge conduit 21 is a discharge control valve 22. Upper end portion 12 has a lower end 27 that is remote from flange 13. Lower end portion 20 has an upper end 28 that is remote from discharge conduit 21 and proximate to lower end 27 of upper end portion 12. As shown in FIG. 1, lower end 27 of upper end portion 12 is loosely fitted within lower end portion 20 proximate to its upper end 28 thereby forming an annular gas flow gap 29 between lower end 27 of upper end portion 12 and upper end 28 of lower end portion 20. An inlet 23 for introducing a countercurrent gaseous flow is operatively connected to lower end 20 of vessel 11. Inlet 23 is also operatively connected to a source (not shown) of gas. The gas is nitrogen in the case of metal nitrides and an inert gas such as argon in the case of metal carbides. Proximate to upper end 12 is a gas and volatile material discharge conduit 17. Discharge conduit 17, which may be horizontally disposed or nearly so, is operatively connected to feed conduit 14. Disposed within feed conduit 14 is a feed control means or valve 15. Feed conduit 14 is operatively connected to a source of precursor pellets (not shown). The heating elements 30 combine to form a heated reaction zone 31 having an upper end 32 and a lower end 33. Reference numeral 18 denotes what may be regarded as an upper surface of a pellet bed 19. An outer shell 25 is preferably concentric with vertical vessel 11. The outer shell serves to shield the environment from temperatures used in the heated reaction zone. Outer shell 25 preferably encloses a layer of an insulating material 26 and is cooled using an appropriate system (not shown), such as a watercooling system. Operatively connected to outer shell 25 is a purge gas inlet 34. Inlet 34 is operatively connected to a source of purge gas (not shown). Purge gas flows through insulating material 26 and gas flow gap 29 into vessel 11.

Figure 2:
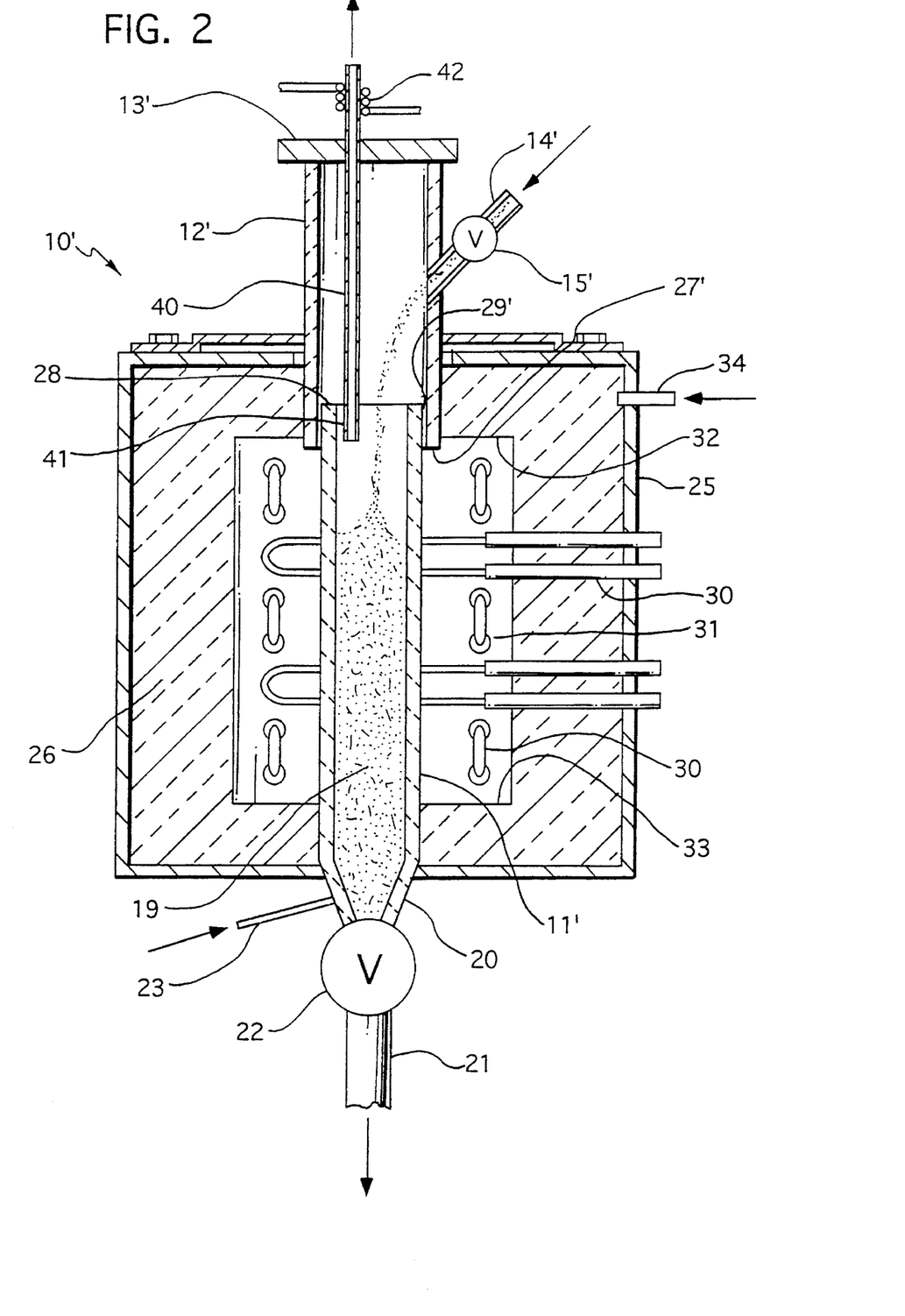
FIG. 2 is a schematic vertical, partial sectional view of an alternate furnace apparatus suitable for use in conjunction with the process of the present invention.

The furnace designated by reference numeral 10' (FIG. 2) consists of a vertical vessel 11' and a plurality of heating elements 30. The vertical vessel 11' includes an upper end portion 12' capped by a flange 13' and a lower end portion 20 operatively connected to a discharge conduit 21. Disposed within discharge conduit 21 is a discharge control valve 22. Upper end portion 12' has a lower end 27' that is remote from flange 13'. Lower end portion 20 has an upper end 28 that is remote from discharge conduit 21 and proximate to lower end 27' of upper end portion 12'. As shown in FIG. 2, lower end 27' of upper end portion 12' is loosely fitted outside lower end portion 20 proximate to its upper end 28 thereby forming an annular gas flow gap 29' between lower end 27' of upper end portion 12' and upper end 28 of lower end portion 20. An internal reactor vent line 40, suitable for removing volatile reactive intermediates, reaction byproducts and reaction products from furnace 10', passes through, and is operatively connected to, flange 13'. Nonvolatile solid materials, such as fine-grained, unreacted feed materials, can also be removed via vent line 40. Vent line 40, which may be vertically disposed or nearly so, is also operatively connected to a means for segregating and collecting volatile materials (not shown). Vent line 40 has a lower end 41 that is remote from flange 13') and proximate to a heated reaction zone 31 formed by heating elements 30. Vent line 40 may have either a single wall or a double wall. If vent line 40 has a double wall, the double wall preferably defines an annular space between an inner wall and an outer wall through which a reactive gas such as nitrogen or an unreactive gas such as argon flows. Although the gas does not pass through a preheating device, it necessarily absorbs at least some heat because vent line 40 is exposed to elevated temperatures that exist above upper surface 18 of pellet bed 19 within vessel 11'. This gas mixes with volatile materials, such as volatile reaction byproducts, proximate to lower end 41 of vent line 40 and then exits vessel 11' via a conduit formed by the inner wall. A cooling means 42, such as a cooling coil, is preferably disposed about at least a portion of vent line 40 and located above flange 13'. If desired, a scraping device (not shown) may be inserted into vent line 40 to periodically remove any solid materials deposited therein. A particularly desirable shape for such a scraping device resembles a corkscrew. Such a shape removes solids, but does not interfere with the flow of gas and volatile material through the tube. Proximate to upper end 12' is a feed conduit 14' that is operatively connected to a source of precursor pellets (not shown). Disposed within feed conduit 14' is a feed control means or valve 15'. Reference numerals 18, 19, 23, 25, 26, 30, 31, 32, 33 and 34 have the same meaning and function in furnace 10' as in furnace 10. As in FIG. 1, purge gas flows from purge gas inlet 34 through insulating material 26 and annular gas flow gap 29' into vessel 11'.

The present invention concerns preparing metal nitride or metal carbide powders from their corresponding metal oxide via carbothermal reduction. The metal oxide is suitably selected from the group consisting of metal oxides having (a) thermodynamic properties such that carbothermal reduction thereof is favored at a temperature within a range of from about 1000° C. to about 2400° C. and (b) a vapor pressure less than or equal to 0.1 atmosphere at a temperature within said range. The low vapor pressure minimizes material loss through volatilization upon introduction of precursor pellets containing such oxides into the reaction zone. The metal oxide suitably has a metal moiety selected from the group consisting of aluminum, silicon, titanium, zirconium, hafnium, tantalum, molybdenum, vanadium, or chromium. The metal moiety is beneficially selected from the group consisting of aluminum, silicon and titanium. The metal moiety is desirably aluminum or silicon.

The metal oxides used in the present invention suitably have a primary particle size within a range of from about 0.05 to about 20 micrometers (μm). The range is beneficially from about 0.2 to about 10 μm, especially when the metal oxide is silica. The range is desirably as low as from about 0.2 to about 2 μm when the metal oxide is alumina. The metal oxides suitably have a purity greater than about 99.8%. The purity is desirably greater than about 99.97%. Higher purities, e.g., 99.99% or greater, will produce satisfactory products, but at a greater cost. The foregoing purities are believed to be suitable for electronic grade uses. Other end use applications may not require such a high degree of purity. As such metal oxide purities as low as 98% or even 96% may produce acceptable metal nitride or metal carbide materials.

The process of the present invention begins when calcined, porous precursor pellets are added directly to a heated, elongated reaction zone of a vertical reactor. The pellets comprise at least one metal oxide, carbon or at least one material capable of supplying carbon, and at least one binder composition. The pellets may further comprise a nonoxide material used as a seed, catalyst or nucleating agent. One such seed material is $Si_3N_4$ when $Si_3N_4$ is desired as a reaction product.

Precursor pellets are suitably prepared by a four step process. In step one, pellet constituents, e.g., a metal oxide powder, are ball milled and then mixed with sufficient water to form an extrudable composition. A low shear mixing device such as a ribbon blender homogenizes pellet constituents and the water without substantial metals contamination levels. In step two, the extrudable composition is processed through an extruder to form extrudates of a desired shape and size, e.g., a diameter of 0.25 inch (in) (0.62 centimeter (cm)) and a length of 0.38 in (0.95 cm). A single screw, single stage, 4 in (10.2 cm) extruder equipped with a die plate having a number of holes of a desired dimension provides satisfactory results, particularly when used in conjunction with a die face cutter. The extrudates are dried in step three to a moisture content of less than about two weight percent (wt-%), based upon pellet weight. The moisture content is beneficially less than about one wt-%. Care must be exercised to avoid drying at such a rapid rate that a crust forms on pellet surfaces thereby interfering with removal of moisture from inner portions of the pellets. Drying typically occurs in an apparatus such as a forced air oven at a temperature of no more than about 150° C. for a period of time sufficient to achieve a target moisture content without forming crust layers. In step four, the dried pellets are "calcined". As used herein, the term "calcined" means that the dried pellets are heated to a temperature sufficient to decompose components of the binder composition into a carbonaceous residue and maintained at that temperature until evolution of residual gases effectively ceases. Calcination temperatures are typically within a range of from about 250° C. to about 350° C.

The pellets must have sufficient strength to withstand a rapid change in temperature, also known as "thermal shock", when they are added to the heated reaction zone without being preheated. In order to achieve this level of strength, the calcination step cannot be eliminated. Without calcination, dried pellets tend to break into very fine powder or dust. Broken pellets can cause bridging problems due to broad size distribution of solid components. The solid components include pellets, broken pellets of various sizes and powder. If the powder and pellet fragments are sufficiently small, they may become fluidized within the bed, thereby causing problems with maintaining an accurate bed level and a continuous flow of solid reactants through the heated reaction zone. The conversion to dust also translates to raw material loss as the dust is caught up in the countercurrent gaseous flow and swept out of the reactor. The carbonaceous residue from decomposed binder materials, especially starches, is believed to provide the pellets with sufficient strength to generally maintain their structural integrity when exposed to the aforementioned thermal shock.

Pellet crush strength (American Society for Testing and Materials (ASTM) Test Method D 4179-82) is believed to be an indicator of resistance to thermal shock. The calcined pellets beneficially have a crush strength within a range of from about 10 to about 20 pounds-force ($lb_f$) (from about 44 to about 88 Newtons (N)). Calcined pellets having a crush strength of less than about 10 $lb_f$ (44N) are susceptible to fragmentation upon exposure to thermal shock in the heated reaction zone. Calcined pellets may have a strength in excess of 20 $lb_f$ (88N), e.g., up to about 100 $lb_f$ (445N). The use of crush strengths in excess of 20 $lb_f$ (88N), particularly those approaching 100 $lb_f$ (445N) provides little, if any, added benefit.

The pellets must also have sufficient porosity to facilitate penetration of gases and allow volatile materials to escape from the pellets as they are heated. In the case of nitrides, the porosity must also be sufficient to facilitate penetration of gaseous nitrogen to effect nitridation. A suitable porosity ranges from about 0.03 to about 0.67 cubic centimeters per gram (cc/g) of precursor pellet material. This equates to a void volume of from about 10% up to about 70%. Porosity may be determined in accordance with ASTM Test Method D-4641-87.

The carbon is suitably a material selected from the group consisting of acetylene black, plant carbon, thermal black, coke, carbon black and graphite. The material is beneficially acetylene black or graphite.

The carbon and metal oxide starting materials need not be substantially pure, i.e., greater than 99.0 wt-% purity. The process of the present invention removes at least a portion of contaminants such as iron and alkali metals that volatilize at reaction zone temperatures. In other words, at least some purification of the precursor pellets occurs after they are added to the heated reaction zone. By way of illustration, AlN prepared by carbothermally reducing precursor pellets containing $Al_2O_3$ in accordance with the present invention contains from about 40% to about 80% less silicon and from about 60% to about 90% less iron than the precursor pellets. As such, one benefit of the present invention is an ability to use lower purity starting materials, e.g., $Al_2O_3$ having a purity of 99.9% rather than 99.99%.

The binder composition is beneficially a blend of wheat and corn starches. The wheat starch is suitably in a pregelatinized, cool water soluble form such as that supplied by Ogilvie Mills under the trade designation GEN VIS 700™. Pregelatinization of starch is a process in which the starch is cooked to its maximum swelling state and then dried to remove the water on drum dryers. The pregelatinization process opens starch granules and allows rapid regelatinization to occur. The corn starch is suitably unmodified, powdered corn starch that is cool water insoluble and hot water dispersible. As used herein, "cool" refers to ambient temperatures, e.g., about 25° C., and "hot" refers to temperatures as high as 80° C., typically from about 58° to about 72° C. The "hot" temperature varies with each starch and is from about 62° to about 72° C. for corn starch and from about 58° to about 64° C. for wheat starch. The terms "starch" and "modified starch", as used herein, are defined in *Condensed Chemical Dictionary*, Eleventh Edition, Van Nostrand Reinhold Company, Inc.(1987), at pages 1089–90. The definitions are as follows:

Starch (CAS: 9005-84-9), a carbohydrate polymer having the following repeating unit:

It is composed of about 25% amylose (anhydroglucopyranose units joined by glucosidic bonds) and 75% amylopectin, a branched-chain structure. Properties: White, amorphous, tasteless powder or granules; various crystalline forms may be obtained, including microcrystalline. Irreversible gel formation occurs in hot water; swelling of granules can be induced at room temperature with such compounds as formamide, formic acid, and strong bases and metallic salts.

Occurrence: Starch is a reserve polysaccharide in plants (corn, potatoes, tapioca, rice, and wheat are commercial sources). Grade: Commercial, powdered, pearl, laundry, technical, reagent, edible, USP. Use: Adhesive (gummed paper and tapes, cartons, bags, etc.), machine-coated paper, textile filler and sizing agent, beater additive in paper making, gelling agent and thickener in food products (gravies, custards, confectionery), oil well drilling fluids, filler in baking powders (cornstarch), fabric stiffener in laundering, urea-formaldehyde resin adhesives for particle board and fiberboard, explosives (nitrostarch), dextrin (starch gum), chelating and sequestering agent in foods, indicator in analytical chemistry, anticaking agent in sugar, face powders, adherent and mold-release agent, polymer base.

Starch, modified. Any of several water-soluble polymers derived from a starch (corn, potato, tapioca) by acetylation, chlorination, acid hydrolysis, or enzymatic action. These reactions yield starch acetates, esters, and ethers in the form of stable and fluid solutions and films. Modified starches are used as textile sizing agents and paper coatings. Thin-boiling starches have high gel strength, oxidized starches made with sodium hypochlorite have low gelling tendency. Introduction of carboxyl, sulfonate, or sulfate groups into starch gives sodium or ammonium salts of anionic starches, yielding clear, non-gelling dispersions of high viscosity. Cationic starches result from addition of amino groups.

The glucose units of starch can be crosslinked with such agents as formaldehyde, soluble metaphosphates, and epichlorohydrin; this increases viscosity and thickening power for adhesives, canned foods, etc.

The starches are beneficially used in a combined amount of from about 5 to about 15 wt-%, based upon weight of non-starch solids contained in the precursor pellets prior to calcination. The combined amount is desirably from about 8 to about 12 wt-%. The combined amount is preferably about 10 wt-%. Suitable amounts for wheat and corn starches both fall within a range of from about 3 to about 12 wt-%, based upon weight of non-starch solids contained in the precursor pellets prior to calcination. A preferred combination is 3 wt-% corn starch and 7 wt-% wheat starch.

Other known binding materials may be used either in conjunction with or in place of the blend of wheat and corn starches provided two conditions are met. Melamine is one material that can be used in conjunction with the blend of starches. First, the materials must decompose to a carbonaceous residue that functions in a manner similar to the residue from the blend of starches. Second, the residue from such binding materials must not adversely affect properties of the resultant carbide or nitride material.

The precursor pellets are added directly to the heated reaction zone at a rate sufficient to partially, but not completely, fill the reaction zone. The rate is desirably within a range of from at least one pound per hour (0.5 kg/hr) to about six pounds per hour (2.7 kg/hr), based upon a heated reaction zone having a diameter of 4.5 inches (11.4 cm) and a length of 4.5 feet (1.4 m). The pellets constitute a moving bed 19 having an upper surface 18 that is continuously renewed as more precursor pellets are added to the reaction zone. The upper surface must not, however, extend above the heated or reaction zone. If this occurs, pellets outside and above the heated zone will be at a temperature lower than that of those within the heated zone. If the temperature of pellets outside the zone is below the temperature at which volatile materials condense, the bed will become plugged. Plugging usually causes cessation of reaction operations for a period of time sufficient to clean reactor surfaces and remove materials forming the plug. The reaction zone must, however, be full enough to allow the carbothermal reaction to proceed substantially to completion before the pellets flow out of the reaction zone.

The heated reaction zone 31 suitably has a cylindrical cross section or shape. This is particularly desirable when vessel 11 or vessel 11' has a cylindrical, albeit larger, cross section or shape. As heated reaction zone 31 increases in size due to an increase in diameter, materials contained in heated reaction zone 31 may experience nonuniform heating as distance from a heating element 30 increases. One means of minimizing such nonuniformity and improving heat transfer involves inserting at least one rod (not shown), preferably fabricated from a heat conducting material such as graphite, into heated reaction zone 31 to occupy a volume that would otherwise be occupied by pellets in the absence of the rod(s). The rod(s) may be solid or hollow and either heated or unheated. If only one rod is used, its axis is desirably located equidistant from all heating elements. The axis is preferably coaxial with the axis of the cylindrical shape of reaction zone 31. Where multiple rods are used, they are desirably spaced to maximize heat transfer and minimize interference with movement of pellets through heated reaction zone 31. A second means of improving heat transfer involves introducing plates (not shown) of heat conducting material, preferably graphite, into heated reaction zone 31. The plates need not be of any particular shape. The shape desirably has a chamfered or beveled edge that faces upper end 32 of heated reaction zone 31. The shape also desirably includes at least one rectangular cross section that has a width equal to an inner dimension, preferably a diameter, of heated reaction zone 31. The rectangular cross section preferably has a length that is greater than the width and a thickness that is sufficiently small to minimize, if not eliminate, blocking of a flow of pellets through heated reaction zone 31.

The countercurrent gaseous flow varies depending upon whether the desired product is a metal nitride or a metal carbide. The gaseous flow comprises nitrogen or a material capable of releasing nitrogen where the desired product is a metal nitride. A neutral gaseous atmosphere, e.g. that provided by a noble gas such as argon, facilitates formation of metal carbides. The gas flow must be at a rate that is sufficiently high to promote the carbothermal reduction action yet sufficiently low to avoid fluidization of the pellet bed. When using the apparatus depicted in FIG. 2, the gas flow must also be low enough to substantially preclude pellets from being drawn into the vent line. One method of specifying suitable gas flow rates is as a percentage of minimum fluidization velocity, $U_{mf}$. The $U_{mf}$ for ¼ inch (0.64 cm) pellets is calculated to be 6.4 feet/second (1.99 meters/second) +/–25 percent error. $U_{mf}$ is a derivation of Ergun's equation for pressure drop through a column. D. Kunii and O. Levenspiel discuss the derivation in *Fluidization Engineering*, pages 66–67 and 72–73 (1969). S. Ergun explains the equation in "Fluid Flow Through Packed Columns", *Chemical Engineering Progress*, volume 48, pages 89–94 (1952). Beneficial results are obtained with gas flow rates range of from about 40 to about 90% of $U_{mf}$. The gas flow rates are desirably from about 60 to about 80% of $U_{mf}$. As flow rates approach $U_{mf}$, the bed of pellets has an increasing tendency to hang up and separate rather than move freely through the reactor. As flow rates approximate $U_{mf}$, the pellets in the bed begin to channel which results in unreacted pellets passing through the reactor.

Nitrogen-containing gases include substantially pure nitrogen gas, gases containing nitrogen or materials such as ammonia that are readily converted to nitrogen gas at reaction zone temperatures. The nitrogen-containing gases are introduced continuously from the bottom of a vertical reactor via a means such as inlet 23 in FIGS. 1 and 2 to provide a counter-current flow against the downward movement of pellets. The nitrogen-containing gas is supplied at a rate sufficient to provide enough nitrogen to yield substantially complete reductive nitridation of the precursor pellets before they exit the reaction zone. Suitable results are obtained when the nitrogen-containing gas is supplied at a rate of from about 2 to about 20 times an amount determined by stoichiometry to satisfy the carbothermal reduction reaction (hereinafter referred to as the "stoichiometric amount"). The nitrogen-containing gas is beneficially supplied at from about 4 to about 16 times the stoichiometric amount when producing metal nitrides other than $Si_3N_4$ and greater than about 16 times the stoichiometric amount when producing $Si_3N_4$. If the supply of nitrogen-containing gas is too low when preparing $Si_3N_4$, the product may be of lower quality or it may require additional treatment steps to render it suitable for use or both. The nitrogen-containing gas is desirably supplied at about 6 times the stoichiometric amount for metal nitrides other than $Si_3N_4$ and at about 18 times the stoichiometric amount when producing $Si_3N_4$.

Exhaust gases from the heated reaction zone contain an amount of carbon monoxide. When preparing a reaction product other than $Si_3N_4$, a partial pressure of carbon monoxide in the exhaust gases of less than about 10% indicates that the reaction is not operating at optimum efficiency. Reaction kinetics for $Si_3N_4$ are considerably slower than for other metal nitrides or carbides such as AlN. As such, a partial pressure of carbon monoxide as low as about 2% may be present in an efficient reaction. A carbon monoxide partial pressure in excess of about 60% indicates that the resultant product will have an undesirably high level of residual or bound carbon.

In a preferred embodiment, illustrated in FIG. 2, the lower end 41 of vent line 40 is located so as to promote removal of substantially all volatile materials from the reactor. Volatile materials include reactive intermediates, reaction byproducts and reaction products. The vent line also desirably removes dust and unreacted, finely divided raw materials. Lower end 41 is desirably located above the upper surface 18 of pellet bed 19, but below a level within vertical vessel 11' at which condensation of volatile materials causes a significant buildup of condensed materials on internal reactor surfaces. That level varies with the metal nitride or metal carbide being produced, but is readily determined without undue experimentation. The lower end 41 is preferably located above upper surface 18, but lower than a level that is proximate to, but above, upper end 32 of heated reaction zone 31. The lower end 41 is more preferably located within heated reaction zone 31, but above upper surface 18. The location that produces optimal results is readily determined without undue experimentation.

The lower end 41 of vent line 40 may be fabricated from either the same material as the rest of vent line 40 or a different material. Vent line 40 is desirably fabricated from a material that is chemically and physically stable under process conditions present in heated reaction zone 31. One such material is graphite. Lower end 41 is preferably either fabricated from, or coated with, boron nitride or another material that resists deposition of condensed or condensable volatile materials. Lower end 41 may have an internal configuration like that of the rest of vent line 40. Lower end 41 is, however, preferably tapered so it has a larger diameter than the rest of vent line 40 or provided with radial holes or slots. The taper, slots, holes or combinations thereof cause lower end 41 to have a lower gas velocity than the rest of vent line 40. The lower gas velocity is believed to substantially minimize any tendency to entrain raw material pellets.

Another feature of the embodiments featured in FIGS. 1 and 2, is purge gas inlet 34. Purge gas flows from a source (not shown) through inlet 34 into a space defined by outer shell 25 and vertical vessel 11 (FIG. 1) or 11' (FIG. 2). The purge gas then flows into vessel 11 via annular gas flow gap 29 or into vessel 11' via annular gas flow gap 29'. At least some of the purge gas flows into vessel 11' via its walls. The purge gas that flows through the walls is at a temperature less than that of gas within reaction zone 31. At least initially, the purge gas that enters vessel 11' tends to flow downward, or away from upper end 12' of vessel 11'. The purge gas then mixes with volatile materials and gas from the countercurrent gaseous flow and enters lower end 41 of vent line 40. The purge gas need not be, but preferably is, the same as that contained in the countercurrent gaseous flow.

The reaction zone is beneficially maintained at a temperature within a temperature range suitable for each material being produced. The range for AlN is suitably from about 1500° Centigrade to about 1800° C., desirably from about 1600° C. to about 1750° C. The range for SiC is suitably from about 1400° C. to about 2200° C., desirably from about 1600° C. to about 1900° C. The range for silicon nitride ($Si_3N_4$) is suitably from about 1200° C. to about 1600° C., desirably from about 1300° C. to about 1500° C.

The carbothermally reduced pellets are removed from the reactor by standard means, e.g., a lockhopper or other solids removal apparatus. Crude product contained in these pellets is recovered by conventional technology. By way of illustration only, free carbon contained in an AlN or $Si_3N_4$ product may be burned out or oxidized in a rotary kiln operating at 750° to 800° C. in the presence of a flowing stream of air and nitrogen. The burned out pellets are then crushed, e.g., by a two-roll crusher, and, if necessary, milled as in a jet mill to obtain a suitable product particle size. SiC recovery includes an additional leaching step after the burnout step to remove unreacted or post reactor oxidized silica ($SiO_2$).

The following examples illustrate the present invention and are not to be construed as limiting the scope of the invention. All parts and percentages are by weight unless otherwise specified.

EXAMPLE 1

Seventy pounds (lbs) (31.8 kg) of $Al_2O_3$ and 25 lbs (11.4 kg) of carbon are milled for four hours at a rate of 30.5 revolutions per minute (rpm) in a 79 gallon (gal) (300 liter (l)) ball mill half filled with 0.5 in (1.3 centimeters (cm)) spherical milling media (99.5% $Al_2O_3$). The $Al_2O_3$, commercially available from Aluminum company of America under the trade designation A16-SG, has a surface area of 9.46 square meters per gram ($m^2/g$). The $Al_2O_3$ has impurity levels, in parts per million (ppm), as follows: calcium - 66; silicon - 53; chromium - less than 10; and iron - 80. The carbon, commercially available from Chevron Chemical Company under the trade designation Shawinigan™ acetylene black, has a surface area of 67 $m^2/g$. The carbon has impurity levels, in ppm, as follows: calcium—15; silicon—120; chromium—3; and iron—18.

One hundred eighty lbs (81.8 kg) of milled material are transferred to a 13 cubic foot ($ft^3$) (0.37 cubic meter ($m^3$)) ribbon blender and dry blended for 15 minutes with 18 lbs (8.2 kg) of wheat derived soluble starch. Thirteen gal (49 l) of water are added to the dry blended mixture at a rate of 3 gal (11.4 l) per minute while continuing blending. Blending continues for an additional 20 minutes and results in a workable or pliable mass of wet blended material.

The wet blended material is fed to a Bonnot, 4 in (10.2 cm), single screw, forming extruder with a packing auger. The extruder, equipped with a die plate containing 132 holes, each having a diameter of 3/16 in (0.5 cm), and a motor driven die face cutter, produces extrudates in the form of right cylinders having a length of 3/16 in (0.5 cm). The cylinders are tumbled in a 30 gal (114 l) drum for about 8 hours to round them to pellets having a generally spherical shape. About 1 lb (0.4 kg) of the milled $Al_2O_3$/carbon mixture is added to the drum prior to starting the tumbling procedure to minimize a tendency of wet cylinders to stick together.

The pellets are loaded in trays to a depth of 2 in (5.1 cm). The trays are loaded into a nitrogen purged oven to calcine the pellets. The oven temperature is increased to 150° C. at a rate of 150° C. per hour, held at that temperature for 15 hours, then increased to 330° C. at a rate of 90° C. per hour and held at that temperature for 2 hours before being decreased to a temperature of 60° C. over a period of 6 hours. The calcined pellets are removed from the oven and screened to remove fines using a 24 in (61 cm) gyratory screen shaker equipped with a U.S. Standard 18 mesh screen (0.001 meter (m) opening).

The screened pellets are loaded into a feed hopper of a vertical, tubular reactor. The reactor includes a 4.5 in (11.4 cm) inside diameter graphite tube with a 4.5 ft (1.4 m) long hot zone. The tube is heated by passing a controlled high current through the tube. Water cooled electrical connections are made at the top and bottom of the tube. The top of the tube is equipped with gas outlet piping and a feed pipe from a variable speed, three inch (7.6 cm) rotary feed valve. The feed valve is, in turn, supplied with pellets from the feed hopper. The bottom of the tube is equipped with a variable speed, 3 in (7.6 cm) rotary valve to control material levels within the tube. Above this valve are connections, such as line 23 in FIGS. 1 and 2, to supply gaseous nitrogen which flows upward through a bed of pellets contained in the tube and out the top of the tube via the outlet piping. Below the valve is a lockhopper arrangement to aid in removing product from the reactor.

Reactor bed level is determined by a series of five pyrometers which are evenly spaced along the hot zone. A video camera mounted at the top of the reactor provides visual images which can be correlated to bed depth.

After filling the reactor with a sufficient amount of previously reacted pellets to establish a bed level of 20% of the hot zone, the reactor is preheated to a temperature of 1200° C. Gaseous nitrogen is supplied to the reactor at a rate of one standard cubic foot per minute (SCFM) (28.3 standard liters per minute (SLM) or 0.283 cubic meters per second ($m^3$/sec)) during preheating. Once this temperature is reached, calcined pellets are added at a rate of 6 lbs (2.7 kg) per hour and product pellets are removed at a rate of 1.8 lbs (0.8 kg) per hour. The rates of addition and removal continue until the bed level or top of the bed reaches about 82% of the hot zone at which time the feed rate is reduced to about 3 lbs (1.4 kg) per hour to maintain a bed level at or near 82%. Concurrent with increasing the bed level, the temperature is increased to 1700° C. over a period of 2.5 hours. In addition, the rate of supply of gaseous nitrogen is increased to 1.7 SCFM (48.1 SLM) at the same time feeding calcined pellets to the reactor commences.

The product from the reactor is a light gray pellet of approximately the same size as the calcined pellets. Analysis of the product via x-ray diffraction reveals that it is primarily aluminum nitride. Analysis of the product for carbon using a LECO model IR-412 with a Model HF-400 furnace reveals a carbon content of about 3%. Analysis of the product for oxygen using a LECO model TC-436 with a Model EF-400 furnace reveals an oxygen content of about 0.2%. This product is further processed in a rotary burnout furnace at 750° C. with a 50/50 volumetric mixture of air and nitrogen for a period of 120 minutes to remove excess carbon. The product, after further processing, is primarily aluminum nitride with a surface area of 2.41 $m^2$/g and the following impurities: oxygen—0.70%; carbon—0.05%; calcium—21 ppm; silicon—66 ppm; chromium—9 ppm; and iron—13 ppm.

EXAMPLE 2

Calcined pellets are prepared as in Example 1 save for using a mixture of 4% wheat derived soluble starch and 6% corn derived insoluble starch rather than 10% wheat derived soluble starch. The calcined pellets have a crush strength of between 6 and 9 $lb_f$ (between 26.7 and 40.0N). The calcined pellets are reacted as in Example 1 with some process modifications. The modifications are: a gaseous nitrogen flow rate of 2.7 SCFM (76 SLM)) rather than 1.7 SCFM; a product removal rate of from 1.2 to 1.8 lbs (0.5 to 0.8 kg) per hour rather than 1.8 lbs per hour; and a calcined pellet feed rate of 2.0 to 3.0 lbs (0.9 to 1.4 kg) per hour rather than 3.0 lbs per hour.

The product, after processing to remove excess carbon as in Example 1, is predominantly AlN with a surface area of 2.83 $m^2$/g and the following impurities: oxygen—1.17%; carbon—0.08%; calcium—123 ppm; silicon—83 ppm; chromium—less than 10 ppm; and iron —21 ppm.

Comparative Example A

The process of Example 1 is duplicated save for continuing to add calcined pellets until the top of the bed is about 6 in (15.2 cm) above the top of the hot zone. This corresponds to a bed level of about 110%. The temperature of those pellets above the hot zone is less than about 1000° C. Once this state is achieved, the bed level continues to rise notwithstanding removal of product from the reactor, an indication of bridging or plugging of the bed at some point in the reactor.

After shutting down the reactor, one can see that pellets of calcined material at or near the top of the bed are bonded together.

Comparative Example B

The procedure of Example 2 is duplicated save for certain changes. The changes include a reactor temperature of 1600° C., a product removal rate of 2.0 lbs (0.9 kg) per hour, and a nitrogen flow rate of 1.8 to 2.75 SCFM (51 to 78 SLM). The product, prior to carbon burnout, has an oxygen content between 0.5 and 0.9%.

After attaining a steady state based upon the foregoing parameters, the calcined pellets are replaced by pellets prepared in the same manner save for calcination at temperatures in excess of 150° C. In other words, the pellets are dried at 150° C., but not calcined. Images taken by the video camera show a dust cloud above the top of the reactor.

After a couple of hours of operation, images on a video monitor show that the top of the bed appears to be bubbling in a manner like that observed in a fluidized bed. The product has an oxygen content which ranges from 5 to 20%. The increased oxygen content indicates an incomplete reaction that may be due, in part, to the presence of fine particles that are capable of being fluidized. It also indicates that a substantial percentage of the feed material passes through the reactor with only a short exposure to reaction conditions.

EXAMPLE 3

The procedure of Example 2 is duplicated save for using a mixture of 2% soluble wheat derived starch and 8% corn derived insoluble starch rather than a mixture of 4% soluble wheat derived starch and 8% corn derived insoluble starch. The calcined pellets have a crush strength of 2 to 4 $lb_f$ (8.9 to 17.8N ).

A significant amount of dust can be seen on the video monitor. This indicates that some feed pellet degradation is taking place. Analysis of product size shows a broad distribution rather than the pellets having nearly the same size as the calcined pellets as in Example 2. The oxygen content of the product varies between 0.5 and 0.9 percent.

Similar results are obtained with a mixture of 3% soluble wheat derived starch and 7% corn derived insoluble starch.

Examples 1–3 and Comparative Examples A and B demonstrate two points. First, the process of the present invention yields a product with fixed or bound carbon and oxygen contents of less than about one percent. Second, wheat starch or a mixture of wheat and corn starches with sufficient wheat starch may be used as a binder material provided the binder material is calcined. Similar results are obtained with other materials and process variations, all of which are disclosed herein.

EXAMPLE 4

Crystalline Silica (Unimin Iota Standard) is processed via a two pass jet milling operation to reduce the particle size such that all material is less than 20 μm in diameter with a mean diameter of less than 10 μm. A 10.7 ft³ (0.30 m³) ball mill half filled with 0.5 in (1.3 cm) flint milling media is used to mill batches of raw materials for five hours. Each batch of raw materials contained 31.27 lbs (14.2 kg) of the jet milled silica, 25 lbs (11.4 kg) of the same carbon black as used in Example 1, 6.25 lbs (2.8 kg) of $Si_3N_4$ powder (Ube SN-E10) and 3.68 lbs (1.7 kg) of melamine (American Cyanamid AERO™ brand).

A 12.6ft³ (0.36 m³) ribbon blender is used to convert 125 lbs (56.8 kg) of the ball milled raw materials, 9.72 lbs (4.4 kg) of wheat starch and 4.17 lbs (1.9 kg) of corn starch into a wet mixture suitable for forming pellets. The starches are the same as those used in Examples 1 and 2. The raw materials and starch are first dry blended for 20 minutes. With the ribbon blender running, 8.9 gal (33.7 l) of water are added at a rate of 1.0 gal/min (3.8 l/min). Blending continues for 20 minutes after all of the water is added.

The wet mixture is converted into pellets in the form of right cylinders having a length of ⅜ in (0.9 cm) and a diameter of ¼ in (0.6 cm). The pellets are loaded into trays and placed into a nitrogen purged oven as in Example 1. The extrudates are calcined by heating the oven to a temperature of 150° C. in one hour, maintaining that temperature for eight hours, increasing the temperature to 330° C. in one hour, maintaining that temperature for eight hours, and then cooling to room temperature.

The cooled pellets are loaded into the feed hopper of a modified version of the reactor used in Example 1. The modified version includes three modifications, all of which are shown schematically in FIG. 2. The modifications are: adding a volatile material vent line (also known as a dip tube); altering the direction of pellet feed; and introducing a flow of nitrogen into the reactor via an annular space in the vent line. The nitrogen gas is added at a rate of 3 SCFM (85 SLM). The dip tube has a lower end that extends to within about 20 in (50.8 cm) of a desired reactor bed level (about 82% of the hot zone).

The reactor is preloaded to the desired bed level with about 21.45 lbs (9.75 kg) of cooled pellets and purged with nitrogen gas for two hours. The reactor is heated to 1465° C. over a 10.5 hour period before pellet addition and product removal start. The reactor is operated at a temperature of 1490° C. with a nitrogen flow rate of six SCFM (169.9 SLM).

Raw silicon nitride product is removed from the reactor at a rate of 1.0 lb/hr (0.5 kg/hr). The product is primarily silicon nitride with a surface area of 10 m²/g and the following impurities: oxygen—1.6%; carbon—0.4%; calcium—16 ppm; aluminum 110 ppm; and iron—11 ppm. Similar results are obtained with other materials and process variations, all of which are disclosed herein.

A video camera view of the interior of the reactor shows very little accumulation of material near the top of the reactor after 60 hours of operation. In the absence of the dip tube, the camera view is often obscured within 60 hours and material accumulation in the top of the reactor can be substantial.

What is claimed is:

1. An improved vertical, gravity flow, moving bed carbothermal reactor having a first end, a second end and, disposed between and operatively connected to said first and second ends, a heatable elongated reaction zone, the improvement comprising adding a means for removing volatile materials from the reaction zone, said removing means being a hollow tube extending into the heatable reaction zone, and being spaced apart from internal reactor surfaces that define the heatable reaction zone, the hollow tube having a first end and a second end, the first end extending into the reactor to a point that is a) below a level within the reactor that is at a temperature where condensation of volatile materials can occur, but b) above a level within the reactor where solid reactants would be drawn into the tube, the second end of the hollow tube being in contact with the first end of the reactor.

2. An improved vertical, gravity flow, moving bed carbothermal reactor having a first end, a second end and, disposed between and operatively connected to said first and second ends, an elongated heatable reaction zone, wherein the improvement comprises:

(i) a means for removing volatile materials spaced apart from internal reactor surfaces that define the reaction zone wherein said removing means is a hollow tube having a first end and a second end, the first end extending into the reactor to a point that is a) below a level within the reactor that is at a temperature where condensation of volatile materials can occur, but b) above a level within the reactor where solid reactants would be drawn into the tube, the second end of the hollow tube being in operative contact with the first end of the reactor and (ii) a heat transfer means for minimizing nonuniform heating and improving heat transfer within the heatable reaction zone, the heat transfer means being in contact with at least a portion of the internal reactor surfaces.

3. The reactor of claim 2 wherein the means is at least one rod that is fabricated from a heat conducting material.

4. The reactor of claim 2 wherein the means is at least one plate that is fabricated from a heat conducting material.

5. The reactor of claim 4 wherein the plate has a chamfered edge that faces the first end of the reaction zone and at least one rectangular cross section that has a width equal to a straight line distance between internal reactor surfaces that define the heated reaction zone so that at least a portion of said rectangular cross section abuts, and is in contact with, said internal reactor surfaces.

* * * * *

UNITED STATES PATENT AND TRADEMARK OFFICE
CERTIFICATE OF CORRECTION

PATENT NO. : 5,607,297
DATED : March 4, 1997
INVENTOR(S) : John P. Henley, et al It is certified that error appears in the above-identified patent and that said Letters Patent is hereby corrected as shown below:

Claim 3, column 14, line 41, following <u>wherein the</u> insert - - heat transfer - -

Claim 4, column 14, line 43, following <u>wherein the</u> insert - - heat transfer - -

Signed and Sealed this

Ninth Day of May, 2000

Attest:

Q. TODD DICKINSON

Attesting Officer        *Director of Patents and Trademarks*